United States Patent
Katusic et al.

(10) Patent No.: US 10,204,723 B2
(45) Date of Patent: Feb. 12, 2019

(54) IRON-SILICON OXIDE PARTICLES HAVING AN IMPROVED HEATING RATE

(71) Applicants: Stipan Katusic, Bad Soden (DE); Harald Alff, Kahl (DE); Peter Albers, Hanau (DE); Harald Herzog, Karlstein (DE); Peter Kress, Karlstein (DE)

(72) Inventors: Stipan Katusic, Bad Soden (DE); Harald Alff, Kahl (DE); Peter Albers, Hanau (DE); Harald Herzog, Karlstein (DE); Peter Kress, Karlstein (DE)

(73) Assignee: EVONIK DEGUSSA GmbH, Essen (DE)

( * ) Notice: Subject to any disclaimer, the term of this patent is extended or adjusted under 35 U.S.C. 154(b) by 231 days.

(21) Appl. No.: 14/418,989

(22) PCT Filed: Jul. 17, 2013

(86) PCT No.: PCT/EP2013/065063
§ 371 (c)(1),
(2) Date: Feb. 2, 2015

(87) PCT Pub. No.: WO2014/023540
PCT Pub. Date: Feb. 13, 2014

(65) Prior Publication Data
US 2015/0213927 A1  Jul. 30, 2015

(30) Foreign Application Priority Data

Aug. 7, 2012 (DE) ........................ 10 2012 213 986

(51) Int. Cl.
| | | |
|---|---|---|
| *H01F 1/01* | (2006.01) | |
| *H01F 1/11* | (2006.01) | |
| *B05D 1/02* | (2006.01) | |
| *C09K 3/14* | (2006.01) | |
| *C01G 49/00* | (2006.01) | |
| *C01G 49/02* | (2006.01) | |
| *C09C 1/24* | (2006.01) | |

(52) U.S. Cl.
CPC ................. *H01F 1/01* (2013.01); *B05D 1/02* (2013.01); *C01G 49/00* (2013.01); *C01G 49/02* (2013.01); *C09C 1/24* (2013.01); *C01P 2002/01* (2013.01); *C01P 2002/50* (2013.01); *C01P 2002/52* (2013.01)

(58) Field of Classification Search
CPC . H01F 1/01; H01F 1/112; H01F 1/344; H01F 1/36; B05D 1/02; C09K 3/1436; C01P 2002/52; C01P 2002/72; C01P 2004/84; C01P 2006/90

USPC ......... 252/62.59, 62.57, 62.58, 62.62, 62.63, 252/62.56; 423/335, 274, 275, 336, 337, 423/622; 427/126.3, 219, 397.7
See application file for complete search history.

(56) References Cited

U.S. PATENT DOCUMENTS

| | | | |
|---|---|---|---|
| 2002/0177311 A1 | 11/2002 | Schumacher et al. | |
| 2008/0311291 A1* | 12/2008 | Schumacher | ......... C01B 13/145 427/215 |
| 2011/0006247 A1* | 1/2011 | Katusic | .................. B82Y 30/00 252/62.59 |
| 2011/0207869 A1* | 8/2011 | Katusic | .................. B82Y 30/00 524/442 |

FOREIGN PATENT DOCUMENTS

| | | |
|---|---|---|
| DE | 10 2008 044 384 A1 | 6/2010 |
| EP | 1 243 552 A1 | 9/2002 |
| EP | 2 000 439 A1 | 12/2008 |
| EP | 2000439 A1 * | 12/2008 ............. B82Y 25/00 |
| TW | 201208983 A1 | 3/2012 |
| TW | 201231401 A1 | 8/2012 |
| WO | WO 2011/124436 A1 | 10/2011 |
| WO | WO 2012/048985 A1 | 4/2012 |

OTHER PUBLICATIONS

Machine translation of EP 2000439 A1, printed Dec. 7, 2016, 27 pages.*
International Search Report dated Aug. 27, 2013 in PCT/EP2013/065063 Filed Jul. 17, 2013.

* cited by examiner

*Primary Examiner* — Matthew E. Hoban
*Assistant Examiner* — Lynne Edmondson
(74) *Attorney, Agent, or Firm* — Oblon, McClelland, Maier & Neustadt, L.L.P.

(57) ABSTRACT

Core-shell particles containing crystalline iron oxide in the core and amorphous silicon dioxide in the shell and in which
a) the shell contains from 5 to 40% by weight of silicon dioxide,
b) the core contains
  b1) from 60 to 95% by weight of iron oxide and
  b2) from 0.5 to 5% by weight of at least one doping component selected from the group consisting of aluminum, calcium, copper, magnesium, silver, titanium, yttrium, zinc, tin and zirconium,
c) where the % by weight indicated are based on the core-shell particles and the sum of a) and b) is at least 98% by weight of the core-shell particles,
d) the core has lattice plane spacings of 0.20 nm, 0.25 nm and 0.29 nm, in each case+/−0.02 nm, determined by means of HR-TEM.

13 Claims, No Drawings

IRON-SILICON OXIDE PARTICLES HAVING AN IMPROVED HEATING RATE

The invention relates to iron-silicon oxide particles having an improved heating rate in the magnetic field, their production and their use.

In some embodiments of the present invention, the core-shell particles have been modified by adsorption, reaction on the surface or complexation of or with inorganic and organic reagents.

WO 03/042315 describes the use of iron-silicon oxide particles for the inductive heating of adhesive bonds. The particles can be obtained either by sol-gel routes or by flame pyrolysis.

WO 2010/063557 discloses iron-silicon oxide particles which can be used for inductive heating. The particles have a core-shell structure with the iron oxide phases haematite, magnetite and maghemite as core and an amorphous shell composed of silicon dioxide. The particles are produced by reacting a mixture of silicon compounds of which one is monosilane and an iron compound in a hydrogen/oxygen flame.

EP-A-2000439 discloses doped iron-silicon oxide particles having a core-shell structure, where the choice of doping components is restricted to those which have magnetic properties. In addition, the particles have a quite high chloride content. The particles are obtained by flame pyrolysis, in which reducing gases are introduced into various reaction zones.

WO 2012/048985 discloses acicular iron oxide particles which are enveloped in silicon dioxide and can be doped by P, Si, Al, Mg, Co, K or Cr. No information is given regarding amounts and regarding the compounds which can be used. The doping serves to influence particle size and shape. The chemical form of the doping component and the place in the particle, core and/or shell in which the doping component is incorporated are not known.

The documents cited in the prior art disclose the use of iron-silicon oxide particles for inductive heating in an alternating magnetic or electromagnetic field. Although the heating times were able to be improved considerably, it remains an objective to reduce the heating times further. It was therefore an object of the present invention to provide a material by means of which this objective can be achieved.

The invention provides core-shell particles containing crystalline iron oxide in the core and amorphous silicon dioxide in the shell, characterized in that
a) the shell contains from 5 to 40% by weight of silicon dioxide,
b) the core contains
  b1) from 60 to 95% by weight of iron oxide and
  b2) from 0.5 to 5% by weight of at least one doping component selected from the group consisting of aluminium, calcium, copper, magnesium, silver, titanium, yttrium, zinc, tin and zirconium,
c) where the % by weight indicated are based on the core-shell particles and the sum of a) and b) is at least 98% by weight, preferably at least 99% by weight, of the core-shell particles,
d) the core has lattice plane spacings of 0.20 nm, 0.25 nm and 0.29 nm, in each case +/−0.02 nm, determined by means of high resolution transmission electron microscopy (HR-TEM).

The particles of the invention are largely present in the form of isolated individual particles. The individual particles have a largely spherical to nodule-like shape. Acicular particles are not found. Apart from the isolated individual particles, three-dimensional aggregates of these particles can also be present. In these aggregates, the individual particles are firmly grown together. The proportion of aggregates is less than 50% by weight, preferably less than 20% by weight, based on the sum of individual particles and aggregates. The determination can be carried out, for example, by image analysis of transmission electron micrographs by means of suitable software, as is already known for other magnetic core-shell particles.

The BET surface area of the particles of the invention is generally from 5 to 40 m$^2$/g, preferably from 10 to 25 m$^2$/g.

The shell of the particles of the invention contains or consists of at least 95% by weight, preferably at least 98% by weight, of amorphous silicon dioxide. For the purposes of the present invention, an amorphous material is one in which no diffraction signals can be detected by conventional methods of X-ray diffraction. The shell is an impermeable shell. For the purposes of the present invention, impermeable means that contact of the particles for 12 hours at 60° C. with hydrochloric acid results in less than 300 ppm of iron being detectable, with hydrogen peroxide less than 10 ppm of iron being detectable or with an NaCl/CaCl$_2$ solution less than 50 ppm of iron being detectable. The thickness of the outer shell is preferably from 1 to 40 nm, particularly preferably from 5 to 20 nm. The thickness of the shell can, for example, be determined by analysis of HR transmission electron micrographs.

The crystalline iron oxide present in the core of the particles of the invention can be magnetite, maghemite or haematite as main component. The abovementioned lattice plane spacings correspond to these iron oxide modifications. Thus, the lattice plane spacings of 0.20 nm and 0.29 nm correspond to maghemite and magnetite, while the lattice plane spacing of 0.25 nm corresponds to maghemite, magnetite and haematite. No lattice plane spacings which could be assigned to the doping component are detected in the HR transmission electron micrographs.

Even by means of X-ray diffraction, no parameters which can be assigned to the doping component can be detected. It can be assumed that the doping component has been built into the lattice of the iron oxide modification present in the core of the particles.

The preferred doping component is at least one selected from the group consisting of aluminium, calcium, copper, magnesium, zinc and tin. The best results are obtained using aluminium or zinc as doping component. The proportion of these doping component is preferably from 1 to 2% by weight, based on the core-shell particles. It has been found that larger proportions of these doping components do not lead to a shortening of the heating times.

The core of the core-shell particles of the invention preferably has a ratio of (magnetite+maghemite)/haematite of from 70:30 to 95:5 and a ratio of magnetite/maghemite of from 50:50 to 90:10. The best heating times are achieved at these ratios. The composition of the core in respect of maghemite, magnetite and haematite can be determined by X-ray diffraction using Co—K$_\alpha$ radiation in a 2Θ angle range of 10-100°. In this way, maghemite can be detected significantly by means of the reflections (110) and (211) in the front angle range. Haematite can be identified unambiguously because of the free-standing reflections. Quantitative phase analysis is carried out by means of the Rietveld method, errors about 10% relative.

The core-shell particles of the invention can contain one or more compounds comprising the elements iron, silicon and oxygen, which in the HR transmission electron micrograph have a spacing of the lattice planes of 0.31+/−0.01 nm, in a boundary layer between core and shell.

This can be established using XPS-ESCA (XPS=X-ray photoelectron spectroscopy; ESCA=electron spectroscopy for chemical analysis) and TEM-EDX analysis (transmission electron microscopy [TEM] in combination with energy-dispersive analysis of characteristic X-rays [EDX]). These compounds can surround the core in the form of a further shell, in addition to silicon dioxide. The thickness of this shell is from 0.5 to 2 nm. This shell represents a transition region between amorphous silicon dioxide shell and crystalline iron oxide core and leads to excellent adaptation between core and outer shell. It is at the present time assumed that phonon transport and thus heat conduction from the core to the outer shell is improved by this intimate bond, which in the use of the particles of the invention can lead to substantially higher heating rates.

The particles of the invention additionally have hydroxyl groups on their surface. These can react with inorganic and organic agents for surface modification to form a van der Waals interaction or an ironic or covalent bond. Suitable agents for surface modification can be, for example, alkoxysilanes, carboxylic acids, nucleic acids or polysaccharides.

A further subject of the invention is a process for producing the core-shell particles, in which
a) a mixture containing
  a1) an aerosol obtained by atomization of a solution containing in each case one or more oxidizable and/or hydrolysable iron compounds, and in each case one or more dopants selected from the group consisting of aluminium, calcium, copper, magnesium, silver, titanium, yttrium, zinc, tin and zirconium,
  a2) one or more hydrogen-containing fuel gases and
  a3) one or more oxygen-containing gases
  is ignited and allowed to react in a first zone (zone 1) of a flow reactor,
b) one or more hydrolysable and/or oxidizable silicon compounds are added to this reaction mixture in a second zone (zone 2) of the flow reactor,
c) the reaction mixture is then optionally cooled and the solid is separated from materials in gaseous or vapour form and
d) the solid is optionally subsequently treated with an agent for surface modification.

The reaction conditions can preferably be selected so that the average residence time in zone 1 is from 10 ms to 1 s, particularly preferably from 300 to 600 ms, and the temperature in this zone is preferably from 800 to 1300° C., particularly preferably 950-1100° C., and the average residence time in zone 2 is from 0.1 to 10 s, particularly preferably from 1 to 3 s, and the temperature in this zone is preferably from 400 to 900° C., particularly preferably from 700 to 850° C. In zone 1, the temperature is measured 50 cm below the ignition point, while in zone 2 it is measured 15 cm above the uppermost point of introduction into zone 2.

The silicon compound is preferably selected from the group consisting of $SiCl_4$, $CH_3SiCl_3$, $(CH_3)_2SiCl_2$, $(CH_3)_3SiCl$, $HSiCl_3$, $(CH_3)_2HSiCl$ and $CH_3C_2H_5SiCl_2$, $H_4Si$, $Si(OC_2H_5)_4$ and $Si(OCH_3)_4$. Particular preference is given to using $SiCl_4$ and/or $Si(OC_2H_5)_4$.

The iron compound is preferably introduced as aerosol. In general, the aerosol is formed from an aqueous solution using an atomization gas such as air or nitrogen and a two-fluid or multifluid nozzle. The average droplet diameter is preferably less than 100 μm, particularly preferably less than 50 μm. Preference is given to using iron(II) chloride as iron compound.

In a particular embodiment of the invention, water or steam can be additionally introduced in zone 2. Here, the water or the steam is introduced separately from the silicon compound, preferably either shortly before or at the level of the point of introduction of the silicon compound. Preference is given to using a molar excess of water or steam. A molar ratio of water/silicon compound of 10-100 can be particularly preferred.

As combustion bases, hydrogen, methane, ethane and/or propane can preferably be used. Particular preference is given to hydrogen. As oxygen-containing gas, use is made mainly of air or oxygen-enriched air. In general, an excess of oxygen over hydrogen is used. Lambda, the ratio of amount of fuel to amount of oxygen, is preferably 1.05-1.50.

Suitable agents for modifying the surface are organosilanes, silazanes or polysiloxanes. These agents are usually sprayed onto the core-shell particles and subsequently treated at temperatures of from 120 to 200° C., preferably under a protective gas atmosphere, for a period of from 1 to 5 hours.

The invention further provides a silicone rubber containing the iron-silicon oxide particles of the invention. The proportion of these particles is preferably 0.5-15% by weight and particularly preferably 3-6% by weight.

The invention further provides for the use of the iron-silicon oxide particles of the invention as constituent of rubber mixtures, of polymer preparations, of adhesive compositions, of shaped polymer composites which can be obtained by welding in an alternating electromagnetic field and for producing dispersions.

EXAMPLES

Analysis

To determine the iron oxide content, the sample was homogenized in a laboratory mill and, after decomposition by fusion, determined titrimetrically. The Fe(III) content was determined and the $Fe_2O_3$ content was calculated therefrom. The content of Si is determined by means of ICP-OES and subsequently calculated as oxide. The content of doping component is determined by ICP-OES after dissolution in mineral acid and converted into oxide contents.

The BET surface area is determined in accordance with DIN 66131.

The determination of the core materials is carried out by X-ray diffraction (Reflexion, θ/θ diffractometer, Co-Kα, U=40 kV, I=35 mA; scintillation counter, adjusted graphite monochromator; angle range (2Θ)/step width/measurement time: 10-100°/0.04°/6 s (4 h)). A quantitative phase analysis is carried out by the Rietveld method (errors about 10% relative). The quantitative phase analysis is carried out with the aid of set 60 of the ICDD database PDF4+ (2010). The phase analysis and the crystallite size determination are carried out using the Rietveld program SiroQuant®, Version 3.0 (2005).

The thickness of the shell is determined by means of high resolution transmission electron microscopy (HR-TEM).

The heating time from 20° C. to 200° C. is determined in a silicone composition. The silicone composition is obtained by mixing 33 g of ELASTOSIL® E50, from Momentive Performance Materials, 13 g of silicone oil type M 1000, from Momentive Performance Materials, 4 g of AEROSIL®150, from Evonik and 2.5 g, corresponding to 4.76% by weight, of core-shell particles by means of a SpeedMixer for 2×30 s and 2×45 s at 3000 rpm. The silicone composition is subsequently applied in a thickness of about 1 mm to a glass microscope slide. The energy input is effected by induction by means of a water-cooled coil having a diameter of 80 mm. The frequency is 510 KHz, and the power is about 12 KW, Fives Celes GTMC 25 KW, France.

Leaching test: 0.33 g of core-shell particles are stored in 20 ml of HCl (1 mol/l) or $H_2O_2$ (0.5 mol/l) or a solution of 8% by weight of NaCl and 2% by weight of $CaCl_2$ in water at 60° C. for a period of 12 hours. Part of the solution is subsequently analysed for iron by means of suitable analytical techniques, for example ICP (inductively coupled plasma spectroscopy).

Example 1

An aerosol is produced by atomization of 4500 g/h of an aqueous solution consisting of 26.1 g of iron(II) chloride, 1.3 g of zinc nitrate and 72.6 g of water, in each case per 100 g of solution, and 3.0 kg/h of nitrogen by means of a two-fluid nozzle. The resulting aerosol is reacted with 8.8 standard $m^3/h$ of hydrogen and 19 standard $m^3/h$ of air, of which 15 standard $m^3/h$ is primary air and 4 standard $m^3/h$ is secondary air, in a first zone. The average residence time of the reaction mixture in the first zone is about 540 ms. A mixture of 410 g/h of gaseous $Si(OC_2H_5)_4$ and 4 standard $m^3/h$ of nitrogen and separately 2.5 kg/h of steam are introduced into the stream of the reaction mixture from the first zone. The average residence time of the reaction mixture in the second zone is 1.7 s. The reaction mixture is subsequently cooled and the solid obtained is separated from the gaseous materials on a filter.

Examples 2 to 10 are carried out analogously. Starting materials and conditions are reported in Table 1. The physicochemical properties of the core-shell particles are reported in Table 2.

The powder of Example 6 in EP-A-2000439 is employed as Comparative Example. This is an iron-silicon mixed oxide powder doped with 1.8% by weight of manganese. The heating time from 20° C. to 200° C. is 15 s.

The powder of Example 10 of WO 2012/048985 is employed as further Comparative Example. This is an iron-silicon mixed oxide powder doped with 108% by weight of phosphorus. The heating time from 20° C. to 200° C. is 17 s.

The core-shell particles of the invention display significantly shorter heating times than powders according to the prior art.

TABLE 1

Starting materials and amounts

| | | | Reaction zone I | | | | | Reaction zone II | | |
|---|---|---|---|---|---|---|---|---|---|---|
| Ex. | Dopant | | Iron chloride g/100 g | Water | Throughput g/h | $t_{RZ1}$ [a] ms | $T_{RZ1}$ ° C. | TEOS g/h | $t_{RZ2}$ s | $T_{RZ2}$ ° C. |
| 1 | $Zn(NO_3)_2$ | 1.3 | 26.1 | 72.6 | 4500 | 540 | 979 | 410 | 1.7 | 808 |
| 2 | | 2.7 | 26.7 | 70.6 | 4000 | 543 | 971 | 360 | 1.8 | 860 |
| 3 | | 2.2 | 27.3 | 70.5 | 4500 | 519 | 1056 | 430 | 1.6 | 803 |
| 4 | | 2.0 | 27.7 | 70.3 | 4400 | 546 | 950 | 430 | 1.7 | 850 |
| 5 | $Al(NO_3)_3$ | 7.1 | 21.0 | 71.9 | 4500 | 525 | 1032 | 430 | 1.6 | 849 |
| 6 | | 3.7 | 25.3 | 71.0 | 4500 | 520 | 1053 | 430 | 1.7 | 847 |
| 7 | | 3.1 | 26.1 | 70.8 | 4500 | 526 | 1027 | 400 | 1.8 | 825 |
| 8 | $MgCl_2$ | 8.8 | 19.4 | 71.8 | 4500 | 540 | 986 | 410 | 1.7 | 840 |
| 9 | $Cu(NO_3)_2$ | 3.4 | 25.7 | 70.9 | 4500 | 528 | 1003 | 430 | 1.7 | 837 |
| 10 | $CaCl_2$ | 2.2 | 27.6 | 70.2 | 4500 | 530 | 998 | 430 | 1.5 | 835 |
| 11 | $Y(NO_3)_2$ | 1.3 | 26.1 | 72.6 | 4500 | 545 | 989 | 410 | 1.7 | 810 |
| 12 | $Ag(NO_3)_2$ | 2.0 | 27.7 | 70.3 | 4500 | 560 | 980 | 410 | 1.8 | 830 |
| 13 | $Zr(NO_3)_2$ | 2.2 | 27.6 | 70.2 | 4500 | 540 | 980 | 425 | 1.7 | 845 |
| 14 | $TiCl_4$ | 3.4 | 25.7 | 70.9 | 4500 | 541 | 985 | 425 | 1.8 | 840 |
| 15 | $C_{10}H_{14}O_5Ti$ | 4.0 | 26.0 | 70.0 | 4500 | 530 | 1000 | 430 | 1.7 | 846 |

TABLE 2

Materials parameters

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Doping component | | | Zn | | | | Al | | Mg | Cu | Ca | Y | Ag | Zr | Ti | Ti |
| Silicon dioxide | % by weight | 15.0 | 14.1 | 14.5 | 14.3 | 14.0 | 14.6 | 14.3 | 14.5 | 14.1 | 13.6 | 14.5 | 14.0 | 14.6 | 14.5 | 13.9 |
| Iron oxide | % by weight | 80.8 | 84.2 | 84.1 | 84.5 | 83.7 | 83.9 | 84.5 | 81.8 | 83.5 | 83.4 | 84.1 | 83.7 | 84.0 | 84.1 | 83.4 |
| Doping component | % by weight | 4.2 | 1.8 | 1.4 | 1.2 | 2.3 | 1.5 | 1.3 | 3.8 | 2.4 | 3.0 | 1.4 | 2.3 | 1.6 | 1.4 | 2.7 |
| Proportion of iron oxide from XRD | | | | | | | | | | | | | | | | |
| (magn. + magh.)/haem.[a] | | — | 70:30 | 76:24 | — | — | 85:15 | 82:18 | — | 87:13 | — | 85:15 | 76:24 | 85:15 | 82:18 | — |
| (magn./magh.) | | — | 57:43 | 68:32 | — | — | 65:35 | 65:35 | — | 83:17 | — | 83:17 | 70:30 | 66:34 | 70:30 | — |
| BET surface area | $m^2/g$ | 9 | 13 | 13 | 14 | 11 | 14 | 14 | 13 | 13 | 11 | 17 | 18 | 19 | 20 | 19 |
| Saturation magnetization | $Am^2/kg$ | 66.7 | — | 61.7 | — | — | 54.6 | — | 66.1 | 66.6 | 65.4 | 61.6 | 60.0 | 65.4 | 61.7 | 66.7 |
| Heating time 20° C. -> 200° C. | s | 8.2 | 9.2 | 5.4 | 5.5 | 6.4 | 6.2 | 5.6 | 6.0 | 6.2 | 8.2 | 6.2 | 5.0 | 5.4 | 7.0 | 6.0 |

TABLE 2-continued

Materials parameters

| Doping component | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | | | Zn | | | | Al | | Mg | Cu | Ca | Y | Ag | Zr | Ti | Ti |
| Fe in solution | | | | | | | | | | | | | | | | |
| HCl | ppm | 60 | — | 240 | 130 | 126 | 131 | 137 | — | 120 | 100 | 50 | 55 | 60 | 40 | 60 |
| $H_2O_2$ | | 3 | 2 | 2.8 | 3 | 2 | 2 | — | 3 | 3 | 3 | 3 | 2 | 5 | 4 | 7 |
| NaCl, $CaCl_2$ | | — | — | 4.5 | 16 | 11 | 17 | 21 | — | — | — | 20 | 21 | 23 | 15 | 21 |

$^{a)}$magn. = magnetite;
magh. = maghemite;
haem. = haematite

The invention claimed is:

1. Core-shell particles comprising crystalline iron oxide in the core and amorphous silicon dioxide in the shell, wherein
   the shell consists of silicon dioxide and wherein silicon dioxide makes up from 5 to 40% by weight of the total weight of the core-shell particles,
   the core consists of iron oxide and at least one doping component selected from the group consisting of aluminium, calcium, copper, magnesium, zinc and tin, wherein
      iron oxide makes up from 60 to 95% by weight of the total weight of the core-shell particles and
      the total amount of the at least one doping component make up from 0.5 to 5% by weight of the total weight of the core-shell particles,
   wherein the total weight of the silicon dioxide, the iron oxide, and the at least one doping component equals 100% by weight,
   the core has lattice plane spacings of 0.20 nm, 0.25 nm and 0.29 nm, in each case+/−0.02 nm, determined by means of high resolution transmission electron microscopy.

2. Core-shell particles according to claim 1, wherein no lattice plane spacings which can be assigned to the doping component can be detected by X-ray diffraction or HR-TEM within a crystalline structure of the iron oxide.

3. Core-shell particles according to claim 1, wherein the doping component is aluminium or zinc.

4. Core-shell particles according to claim 3, wherein the proportion of doping component is from 1 to 2% by weight of the total weight of the core-shell particles.

5. Core-shell particles according to claim 1, wherein the ratio of (magnetite+maghemite) to haematite determined by means of X-ray diffraction is from 70:30 to 95:5 and that of magnetite to maghemite is from 50:50 to 90:10.

6. Core-shell particles according to claim 1, wherein a compound comprising the elements iron, silicon and oxygen and in the HR transmission electron micrograph have a spacing of the lattice planes of 0.31+/−0.01 nm and are present between the core and the shell.

7. Core-shell particles according to claim 1, wherein the core-shell particles have been modified by adsorption, reaction on the surface or complexation of or with inorganic and organic reagents.

8. A process for producing the core-shell particles according to claim 1, comprising:
   igniting and reacting a mixture comprising
      an aerosol obtained by atomization of a solution comprising in each case an oxidizable and/or hydrolysable iron compound, and in each case at least one dopant selected from the group consisting of aluminium, calcium, copper, magnesium, silver, titanium, zinc, tin and zirconium,
      a hydrogen-containing fuel gas and
      an oxygen-containing gas
   in a first zone of a flow reactor;
   adding a hydrolysable and/or oxidizable silicon compound to the reaction mixture in a second zone of the flow reactor; and then
   optionally cooling the reaction mixture and separating the solid from materials in gaseous or vapour form; and then
   optionally subsequently treating the solid with an agent for surface modification.

9. The process according to claim 8, wherein in zone 1 the average residence time is from 10 ms to 1 ms and the temperature is from 800 to 1300° C. and in zone 2 the average residence time is from 0.1 to 10 s and the temperature is from 400 to 900° C.

10. The process according to claim 8, wherein the silicon compound is at least one selected from the group consisting of $SiCl_4$, $CH_3SiCl_3$, $(CH_3)_2SiCl_2$, $(CH_3)_3SiCl$, $HSiCl_3$, $(CH_3)_2HSiCl$ and $CH_3C_2H_5SiCl_2$, $H_4Si$, $Si(OC_2H_5)_4$ and $Si(OCH_3)_4$.

11. The process according to claim 8, wherein water or steam is additionally introduced in zone 2.

12. The process according claim 8, wherein the agent for modifying the surface is an organosilane, a silazane or a polysiloxane.

13. Core-shell particles according to claim 1, wherein the core-shell particles are suitable as constituent of rubber mixtures, as constituent of polymer preparations, as constituent of adhesive compositions, as constituent of shaped polymer composites which can be obtained by welding in an alternating electromagnetic field, and for producing dispersions and for the immobilization of enzymes.

* * * * *